US012728600B2

(12) United States Patent
Wright et al.

(10) Patent No.: US 12,728,600 B2
(45) Date of Patent: Sep. 8, 2026

(54) 3D STRUCTURES TO ENCAPSULATE BUILD MATERIAL

(71) Applicant: Peridot Print LLC, Palo Alto, CA (US)

(72) Inventors: Jacob Wright, San Diego, CA (US); Maria Fabiola Leyva Mendivil, Guadalajara (MX); Sunil Kothari, Palo Alto, CA (US); Lei Chen, Shanghai (CN); Kyle Wycoff, Palo Alto, CA (US); Jun Zeng, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 334 days.

(21) Appl. No.: 18/279,128

(22) PCT Filed: Mar. 9, 2021

(86) PCT No.: PCT/US2021/021447

§ 371 (c)(1),
(2) Date: Aug. 28, 2023

(87) PCT Pub. No.: WO2022/191823

PCT Pub. Date: Sep. 15, 2022

(65) Prior Publication Data

US 2024/0131800 A1 Apr. 25, 2024
US 2024/0227306 A9 Jul. 11, 2024

(51) Int. Cl.

| | |
|---|---|
| ***B29C 64/393*** | (2017.01) |
| ***B29C 64/153*** | (2017.01) |
| ***B33Y 50/02*** | (2015.01) |

(52) U.S. Cl.
CPC .......... *B29C 64/393* (2017.08); *B29C 64/153* (2017.08); *B33Y 50/02* (2014.12)

(58) Field of Classification Search
CPC ................................ B22F 10/73; B33Y 10/00
See application file for complete search history.

(56) References Cited

U.S. PATENT DOCUMENTS

| | | | | |
|---|---|---|---|---|
| 9,718,129 | B2 | 8/2017 | Ljungblad et al. | |
| 2007/0233298 | A1 | 10/2007 | Heide et al. | |
| 2013/0217838 | A1* | 8/2013 | DeFelice | B29C 64/153 528/125 |
| 2017/0120529 | A1* | 5/2017 | DeMuth | B23K 26/704 |
| 2017/0157857 | A1 | 6/2017 | Butcher et al. | |
| 2019/0076925 | A1 | 3/2019 | Lakshman et al. | |
| 2019/0143413 | A1 | 5/2019 | Dave et al. | |
| 2019/0210108 | A1 | 7/2019 | Weaver et al. | |
| 2020/0376751 | A1* | 12/2020 | Ferrar | G01N 1/44 |
| 2022/0145039 | A1* | 5/2022 | Le | B29C 64/357 |

FOREIGN PATENT DOCUMENTS

| | | | |
|---|---|---|---|
| WO | 2016/026820 | A1 | 2/2016 |
| WO | 2018/191035 | A1 | 10/2018 |

* cited by examiner

*Primary Examiner* — Mark A Connolly
(74) *Attorney, Agent, or Firm* — Michael Dryja

(57) ABSTRACT

A computing device comprising a controller is disclosed herein. The controller is to access print data of a virtual build volume including a 3D object to be generated by a 3D printer; modify the print data to include a 3D structure at a location within the build volume to encapsulate an amount of build material; receive powder degradation data corresponding to the powder degradation of the encapsulated amount of build material; and calibrate an additive manufacturing parameter based on the powder degradation data.

17 Claims, 4 Drawing Sheets

MODIFY THE PRINT DATA TO INCLUDE THE EJECTION OF A THERMOCHROMIC DYE COMPOSITION TO AT LEAST PART OF THE 3D STRUCTURE INTERNAL VOLUME

340

3D STRUCTURES TO ENCAPSULATE BUILD MATERIAL

BACKGROUND

Some additive manufacturing or three-dimensional printing systems generate 3D objects by selectively solidifying portions of a successively formed layers of build material on a layer-by-layer basis. The build material which has not been solidified is separated from the 3D objects.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1:
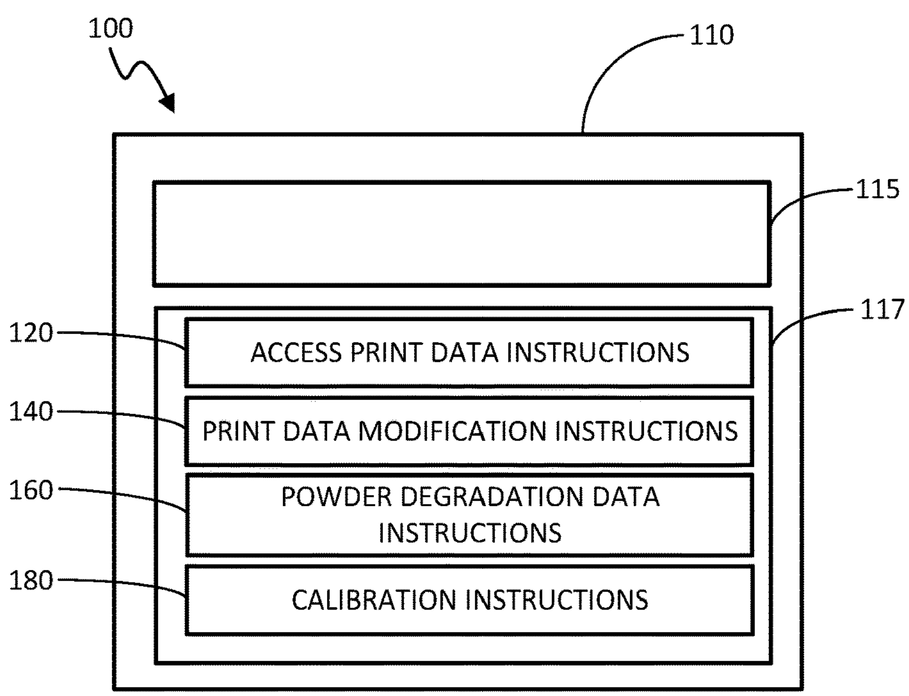
FIG. 1 is a schematic diagram showing an example of a computing system calibrate an additive manufacturing parameter.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same or similar functionality.

3D printers generate 3D objects based on data in a 3D model of an object or objects to be generated, for example, using a CAD computer program product. This data may be pre-processed by a computing system in a suitable format for the 3D printer. In some examples, the pre-processing may include arranging models of the 3D objects to be generated in a virtual build volume corresponding to the physical build volume in which the 3D objects are to be generated, for example in a 3D printer. A print job, or other data, describing the arrangement of 3D objects models within the virtual build volume may be sent to the 3D printer to cause the printer to generate the 3D objects.

3D printers may generate 3D objects by selectively processing layers of build material. For example, a 3D printer may selectively treat portions of a layer of build material, e.g. a powder, corresponding to a slice of 3D object to be generated, thereby leaving the portions of the layer un-treated in the areas where no 3D object is to be generated. The combination of the generated 3D objects and the un-treated build material may also be referred to as build bed. The volume in which the build bed is generated may be referred to as a build volume.

Suitable powder-based build materials for use in additive manufacturing include polymer powder, metal powder or ceramic powder. In some examples, non-powdered build materials may be used such as gels, pastes, and slurries.

Some 3D printers may selectively treat portions of a layer of build material by ejecting a printing fluid in a pattern corresponding to the 3D object and then apply energy to the layer. 3D printers may apply energy to the build material layer, using for example, an energy source. Examples of printing fluids may include fusing agents, detailing agents, curable binder agents or any printing fluid suitable for the generation of a 3D object. After the 3D printing operation corresponding to the generation of the 3D objects within a plurality of build material layers, the build bed may be allowed to cool down so that the 3D objects may be separated from the un-solidified build material. Some other suitable examples of 3D printers may not eject a printing fluid to the powder-based build material layer, such as Selective Laser Sintering (SLS) 3D printers or 3D printers including arrays of Vertical-Cavity Surface-Emitting Lasers (VCSELs).

In some examples, the un-solidified build material is recycled back for additional print jobs. The recycled build material may experience a degree of powder degradation during the previous cycles caused, for example, by the thermal signature of the 3D printer. Additionally, during a given print cycle, fresh powder at a location may experience a different degree of degradation than fresh powder at a different location from the same build bed.

In some examples, powder degradation may be based on the thermal stress or thermal history of the build material powder. Each voxel of build material has its own thermal history. Time spent at an elevated temperature and the peak temperature experienced that a powder voxel reaches are factors that may impact on the degradation of the powdered build material.

Powder degradation may lead to part quality defects. Hence, calibrating the 3D printer printing parameters to minimize the effect of the powder degradation to the final part would lead to better quality 3D printed parts.

Referring now to the drawings, FIG. 1 is schematic diagram showing an example of a computing system 100. The computing system 100 may be an integral part of a 3D printer or an external system from the 3D printer that may interact with the 3D printer, for example an external computing unit suitable for sending data to the 3D printer.

The computing system 100 comprises a controller 110. The controller 110 comprises a processor 115 and a memory 117 with specific control instructions 120-180 to be executed by the processor 115. The functionality of the controller 110 is described further below with reference to FIG. 2.

In the examples herein, the controller 110 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller 110 may be, at least partially, implemented in the form of an electronic circuitry. The controller 110 may be a distributed controller, a plurality of controllers, and the like. In the examples herein, 3D print data is modified to include a 3D structure to encapsulate an amount of build material. Some parameters of the 3D printer are calibrated based on powder degradation data corresponding to the encapsulated amount of build material.

Figure 2:
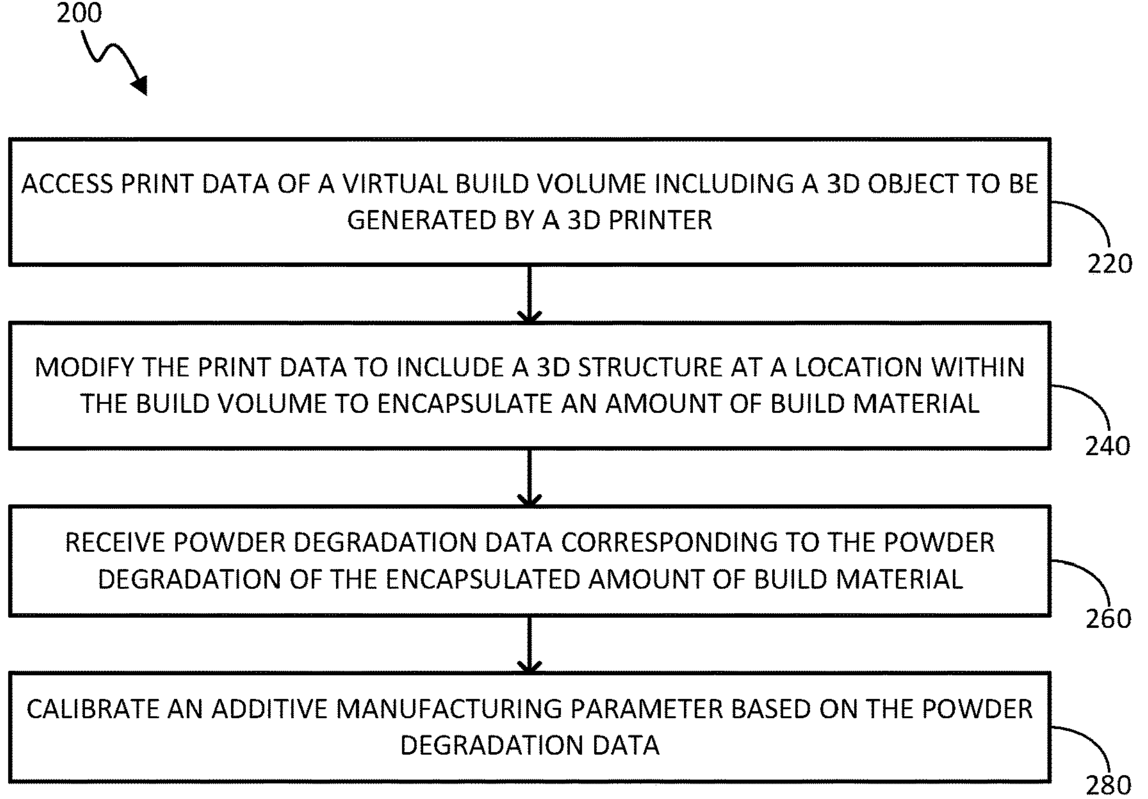
FIG. 2 is a flowchart of an example method of calibrating an additive manufacturing parameter.

FIG. 2 is a flowchart of an example method 200 of calibrating an additive manufacturing parameter. The blocks 220-280 from method 200 correspond to the instructions 120-180 from FIG. 1 respectively, instructions of which when executed, cause the processor 115 of the controller 110 to perform the method 200 of FIG. 2.

At block 220, the controller 110 accesses print data of a virtual build volume including a 3D object to be generated by a 3D printer. The virtual build volume defines an arrangement of the 3D object model with respect the overall build volume which is to be generated by the 3D printer. The arrangement comprises the position and orientation of the 3D object model within the virtual build volume. In some examples, the controller 110 may receive an arrangement with a plurality of 3D object models in the virtual build volume. In even further examples, the controller 110 may receive data corresponding to a plurality of 3D objects to be generated and may compute the arrangement of the corresponding plurality of 3D object models in the virtual build volume.

Different portions of the build bed may exhibit different levels of build material degradation. To that end, the examples herein are to encapsulate build material of different locations of the build volume, obtain build material degradation data, and calibrate 3D printing parameters based on the build material degradation data.

To that end, at block 240, the controller 110 is to modify the print data to include a 3D structure at a location within the build volume. The 3D structure may comprise any geometry suitable to encapsulate an amount of build material. Some examples of 3D structures are polyhedrons with more than three faces, for example, 5, 7, 10, 15, or 20 faces. In other examples, the 3D structures comprise a spherical or semi-spherical geometry. A polyhedron with fewer faces implies that each face extends for a larger surface. In thermal generation processes, the larger surface of a generated part, the more it shrinks. Hence, having a 3D structure in the shape of a polyhedron with a larger number of faces would lead to encapsulating a build material volume with the minimal 3D generated object volume. Some examples of 3D structures are shown with reference to FIGS. 4A-B and 5A-B.

In additional examples, the controller 110 is to include a plurality of 3D structures to the print data, each 3D structure at a different location within the virtual build volume such that different amounts of build material from these respective different locations are to be encapsulated within the 3D structures. In some of these examples, the different locations of the 3D structures are uniformly placed across the build volume (e.g., equidistantly or following a placement pattern). In other of these examples, the different locations of the 3D structures are randomly placed across the build volume. In yet other of these examples, the different locations of the 3D structures are determined based on areas of interest, close to the printed part or based on the printed part location such that the measurement of the encapsulated amount of build material is more representative to the actual amount of build material of the 3D object once generated. Specifically, in some examples, the controller 110 is to modify the print data to embed the 3D structure inside the 3D object geometry to be generated; i.e., the 3D structure is at least partially surrounded by the 3D object geometry.

In some additional examples, the controller 110 is to further modify the print data to include an identification element attached to the 3D structure indicative of the 3D structure location. Some examples of identification elements may include labels, graphic codes (e.g., bar code, QR code), pattern codes, texture codes, and the like. Once the 3D generated objects and the 3D structures are generated and separated from the remaining un-solidified build material, the identification element easily indicates to the user from which sub-volume (i.e., location) is the encapsulated build material of a given 3D structure.

The modified print data is sent to a 3D printer which is to generate the corresponding 3D object and the 3D structure. The encapsulated amount of build material within the 3D structure is extracted and powder degradation data is determined therefrom. In the examples in which a plurality of 3D structures have been printed at different locations, the powder degradation data would include data corresponding to the different locations in which the 3D structures have encapsulated respective amounts of build material.

In some examples, the powder degradation data may include a powder degradation metric. In some examples, the powder degradation metric may include a b* value, a yellowing index, molecular weight, solution viscosity, melt viscosity, intrinsic viscosity, melt flow rate, enthalpy of melt, enthalpy of crystallization, melt temperature, crystallization temperature, density, elongation at break, tensile strength, impact toughness, or a combination thereof. It is noted that this example list is an open list and may further include any other suitable metric which is indicative of the powder degradation of an amount of build material. The b* value is a metric associated with powder color; i.e., Yellowness Index (YI) ASTM E313.

At block 260, the controller 110 is to receive the powder degradation data corresponding to the powder degradation of the encapsulated amount of build material. In some examples, the controller 110 determines the powder degradation data. In other examples, the powder degradation data determination is executed by manual testing or by an independent computing unit, and the resulting determined powder degradation data is accessible by the controller 110.

At block 280, the controller 110 is to calibrate an additive manufacturing parameter based on the powder degradation data. In some examples, the additive manufacturing parameter is a parameter from the 3D printer, for example, agent deposition, lamp irradiation, carriage parameter, build material layer thickness, and the like. In other examples, the additive manufacturing parameter may include a parameter which is not from the 3D printer, for example, a parameter to be included in equations to predict recycling ratio, packing densities (e.g., volume of generated 3D parts with respect the entire virtual volume), how to allocate the 3D objects to be generated in the virtual build volume, and the like.

Figure 3:
FIG. 3 is a flowchart of another example method of calibrating an additive manufacturing parameter.

FIG. 3 is a flowchart of an example method 300 including block 340 of calibrating an additive manufacturing parameter. In some examples, method 300 may be executed after or as part of block 240 from FIG. 2.

Some additive manufacturing build materials lack chromophoric degradation pathways, thereby not changing color (e.g., yellowing) upon degradation. Examples of these materials may include polypropylene. In such cases, it may be a challenge to determine the powder degradation data based on an optical parameter, such as b* value.

At block 340, the controller 110 may further modify the print data to include the ejection of a thermochromic dye composition to at least part of the 3D structure internal volume, thereby partially or completely dyeing the encapsulated build material within the 3D structure. The ejected thermochromic dye composition is to change its color upon thermal exposure, which in some examples it is indicative of powder degradation. The powder degradation data may be determined based on the color change of the thermochromic dye composition.

Some examples of suitable thermochromic dye compositions may be irreversible, thereby not returning to the original color pigment once the pigment is not exposed to the degradation source anymore.

A given thermochromic dye composition may change of color in a different way based on the build material type where the dye composition is ejected thereto. Furthermore, a given type of build material procured by different vendors may vary in composition. Thereby it is advised to add varying amounts of the thermochromic dye composition and/or varying the sampling and sensing from a given dye color when exposed to the degradation source based on the type of build material and/or vendor. Additionally, powder yellowness may interact with the dye color and such combination should be acknowledged by the controller 110. Hence, in some additional examples, the controller 110 is to select the thermochromic dye type and/or amount based on the type of build material used to generate the 3D objects.

Figure 4A:
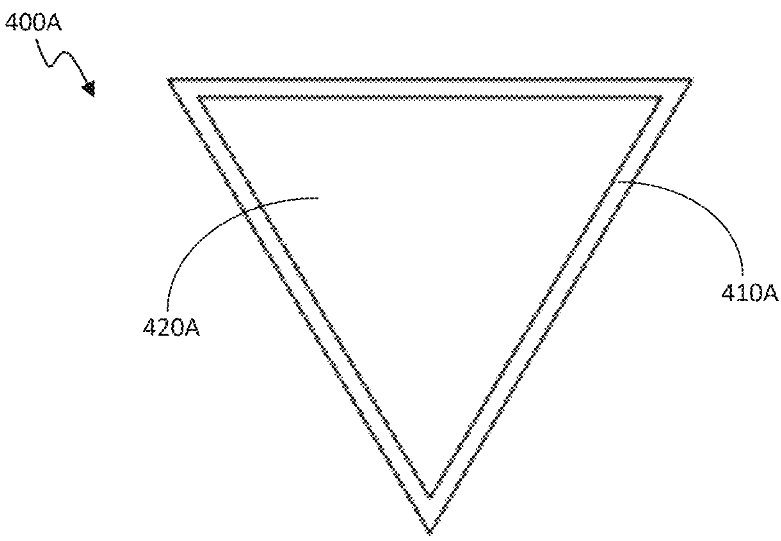
FIG. 4A is an example of a face of a 3D structure to encapsulate build material.
Figure 4B:
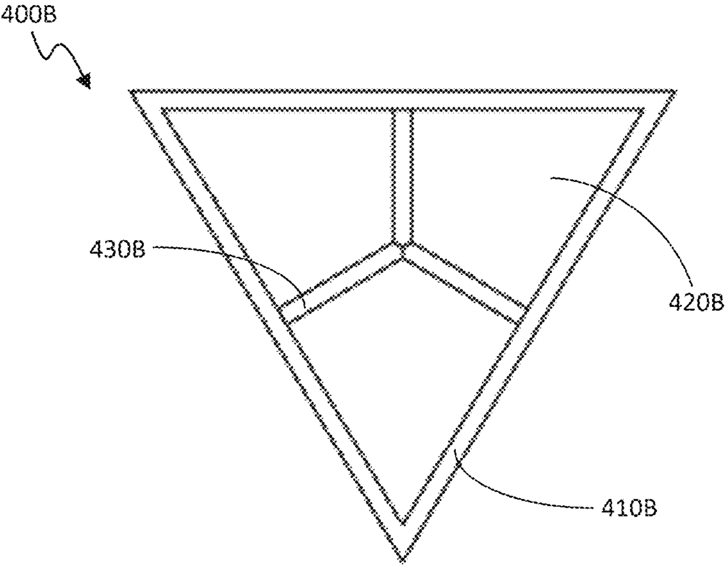
FIG. 4B is another example of a face of a 3D structure to encapsulate build material.
Figure 5A:
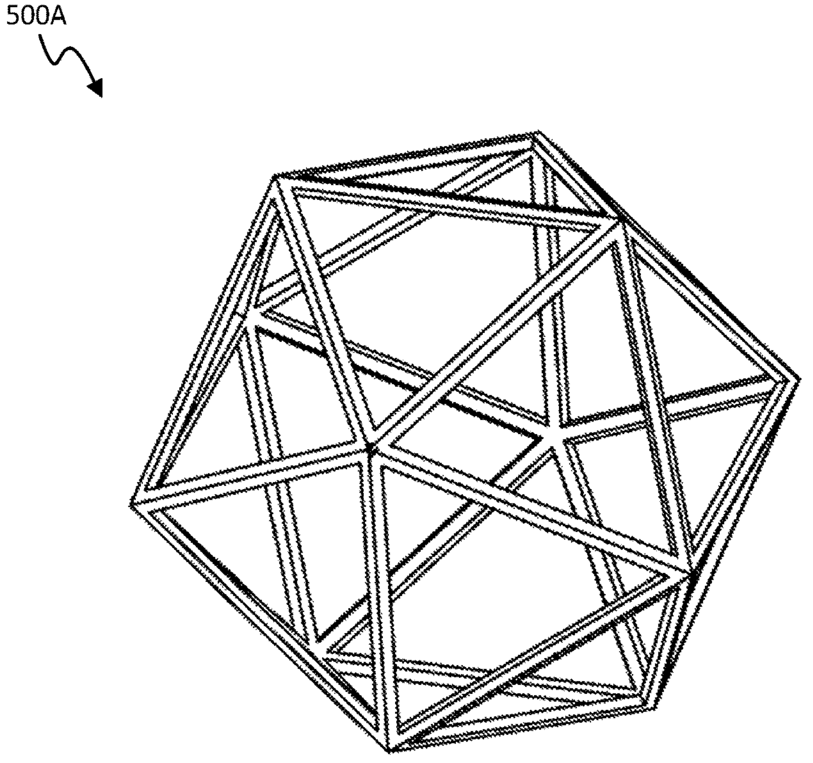
FIG. 5A is an example of a 3D structure to encapsulate build material.
Figure 5B:
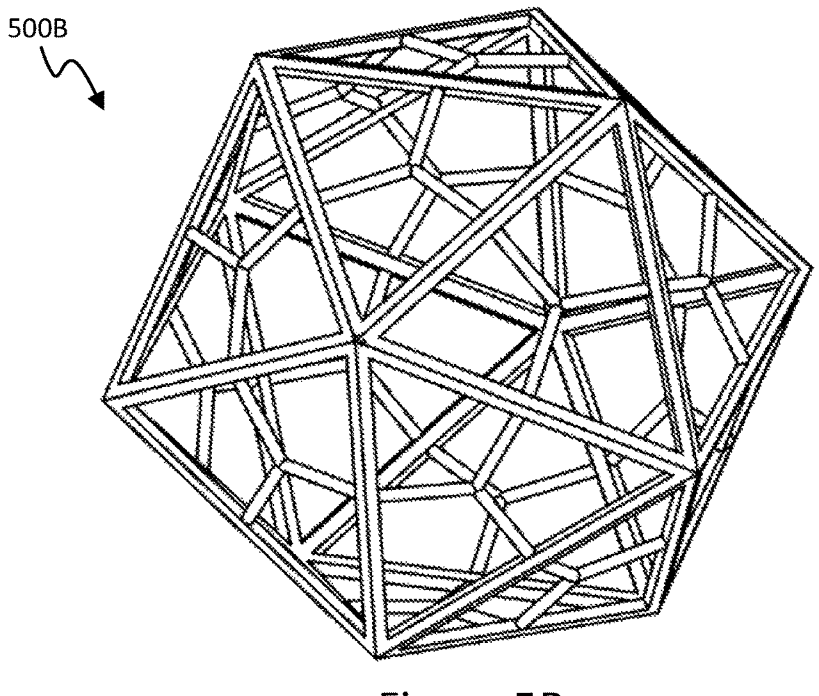
FIG. 5B is another example of a 3D structure to encapsulate build material.

FIGS. 4A-B are examples of a face of a 3D structure to encapsulate build material. FIGS. 5A-B are examples of a 3D structure to encapsulate build material. Face 400A of FIG. 4A may correspond to any of the faces of the 3D structure 500A of FIG. 5A. Face 400B of FIG. 4B may correspond to any of the faces of the 3D structure 500B of FIG. 5B. The 3D structures 500A-B may be examples of the 3D structure to be added to the print data by the controller 110 in, for example, block 240 from FIG. 2.

Some examples of 3D structures 500A-B are polyhedrons with more than three faces 400A-B, for example, 5, 7, 10, 15, or 20 faces. In other examples, the 3D structures may comprise a spherical or semi-spherical geometry. A polyhedron with fewer faces implies that each face extends for a larger surface. In thermal generation processes, the larger surface of a generated part, the more it shrinks. Hence, having a 3D structure in the shape of a polyhedron with a larger number of faces would lead to encapsulating a build material volume with the minimal 3D generated object volume which, in turn, is to have the minimum thermal effect of the encapsulated build material.

In some examples, the face 400A-B is constituted by edges 410A-B defining a hole 420A. In the illustrated examples (e.g., face 400A-B), the surface of the faces is triangular-shaped, thereby each face being constituted by three edges 410A-B. In the examples herein, the thickness (e.g., depth and/or width) of the edges ranges from about 0.3 mm to about 1 mm, for example 0.6 mm. Edges with thinner thicknesses than 0.3 mm may be hard to unpack or decake (i.e., operation of removing un-solidified build material which is not the encapsulated build material from the 3D generated part) since these thin edges may, for example, break. Edges with thicker thicknesses than 1 mm may have an undesired thermal impact to the encapsulated powder. The thermal impact would lead to unreliable powder degradation data determined through the encapsulated thermally impacted powder.

In some additional examples, the face 400B may comprise additional internal structures 430B sub-dividing the hole defined by the edges 410B into a plurality of sub-holes 4206. These internal structures 430B define a plurality of internal chambers within the internal volume of the 3D structure. The internal chambers retain the powder encapsulated therein, thereby reducing the encapsulated build material leakage during the decaking operation. Additionally, in some examples, the encapsulated powder of each of the different internal chambers may be used to measure a different attribute (e.g., a different powder degradation metric).

Figure 6:
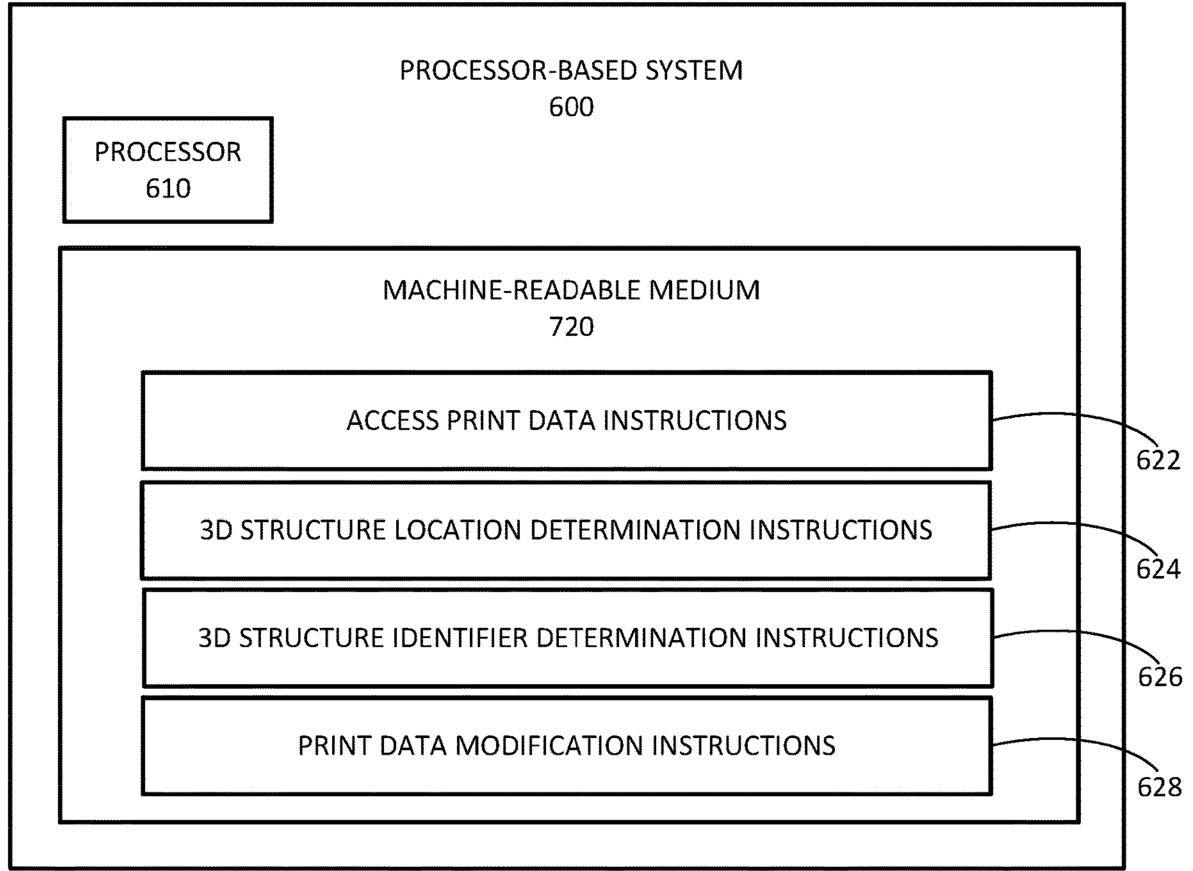
FIG. 6 is a block diagram showing a processor-based system example of a system to modify print data to include a 3D structure.

FIG. 6 is a block diagram showing a processor-based system example of a system to modify print data to include a 3D structure. In some implementations, the system 600 may be or may form part of a computing system and/or a 3D printing system, such as a 3D printer. In some implementations, the system 600 is a processor-based system and may include a processor 610 coupled to a machine-readable medium 620. The processor 610 may include a single-core processor, a multi-core processor, an application-specific integrated circuit (ASIC), a field programmable gate array (FPGA), and/or any other hardware device suitable for retrieval and/or execution of instructions from the machine-readable medium 620 (e.g., instructions 622-628) to perform functions related to various examples. Additionally, or alternatively, the processor 610 may include electronic circuitry for performing the functionality described herein, including the functionality of instructions 622-628. With respect of the executable instructions represented as boxes in FIG. 6, it should be understood that part or all of the executable instructions and/or electronic circuits included within one box may, in alternative implementations, be included in a different box shown in the figures or in a different box not shown.

The machine-readable medium 620 may be any medium suitable for storing executable instructions, such as a random-access memory (RAM), electrically erasable programmable read-only memory (EEPROM), flash memory, hard disk drives, optical disks, and the like. In some example implementations, the machine-readable medium 620 may be a tangible, non-transitory medium, where the term "non-transitory" does not encompass transitory propagating signals. The machine-readable medium 620 may be disposed within the processor-based system 600, as shown in FIG. 6, in which case the executable instructions may be deemed "installed" on the system 600. Alternatively, the machine-readable medium 620 may be a portable (e.g., external) storage medium, for example, that allows system 600 to remotely execute the instructions or download the instructions from the storage medium. In this case, the executable instructions may be part of an "installation package". As described further herein below, the machine-readable medium may be encoded with a set of executable instructions 622-628.

Instructions 622, when executed by the processor 610, may cause the processor 610 to access print data of a virtual build volume including a 3D object to be generated by a 3D printer.

Instructions 624, when executed by the processor 610, may cause the processor 610 to determine a location for a 3D structure within the build volume to encapsulate a corresponding amount of build material therein.

Instructions 626, when executed by the processor 610, may cause the processor 610 to determine an identifier for the 3D structure indicative of the determined location.

Instructions 628, when executed by the processor 610, may cause the processor 610 to modify the print data to include the 3D structure with the determined identifier at the determined location.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A computing system comprising a controller to:

- access print data of a virtual build volume including a 3D object to be generated by a 3D printer;
- modify the print data to include a 3D structure at a location within the build volume to encapsulate an amount of build material;
- receive powder degradation data corresponding to the powder degradation of the encapsulated amount of build material; and
- calibrate an additive manufacturing parameter based on the powder degradation data.

Feature set 2: A computing system with feature set 1, wherein the powder degradation data includes a powder degradation metric.

Feature set 3: A computing system with preceding feature set 2, wherein the controller is to modify the print data to include a plurality of 3D structures at different locations within the build volume to encapsulate the corresponding plurality of amounts of build material.

Feature set 4: A computing system with any preceding feature set 2 to 3, wherein the 3D structure is a polyhedron with more than 3 faces.

Feature set 5: A computing system with any preceding feature set 2 to 4, wherein the 3D structure comprises edges whose thickness is from the range of about 0.3 mm to about 1 mm.

Feature set 6: A computing system with any preceding feature set 1 to 5, wherein a polyhedron face comprises a hole.

Feature set 7: A computing system with any preceding feature set 1 to 6, wherein the 3D structure comprises internal structures to define a plurality of internal chambers within the internal volume of the 3D structure.

Feature set 8: A computing system with any preceding feature set 1 to 7, wherein the controller is to modify the print data to embed the 3D structure inside the 3D object to be generated.

Feature set 9: A computing system with any preceding feature set 1 to 8, wherein the controller is to further modify the print data to include an identification element attached to the 3D structure indicative of the 3D structure location.

Feature set 10: A computing system with any preceding feature set 1 to 9, wherein the controller is to further modify the print data to include the ejection of a thermochromic dye composition to at least part of the 3D structure internal volume.

Feature set 11: A method comprising:

- modifying print data of a virtual build volume including a 3D object to be generated by a 3D printer to include a 3D structure at a location within the build volume to encapsulate an amount of build material;
- generate the 3D object and the 3D structure based on the modified print data;
- determining a powder degradation metric of the encapsulated amount of build material within the generated 3D structure; and
- calibrating an additive manufacturing parameter based on the powder degradation metric.

Feature set 12: A method with any preceding feature set 11, further comprising modifying the print data to include a plurality of 3D structures at different locations within the build volume to encapsulate the corresponding plurality of amounts of build material.

Feature set 13: A method with any preceding feature set 11 to 12, further comprising ejecting a thermochromic dye composition to at least part of the 3D structure internal volume.

Feature set 14: A method with any preceding feature set 11 to 13, further comprising selecting the thermochromic dye type and/or amount based on the type of build material.

Feature set 15: A non-transitory machine-readable medium storing instructions executable by a processor, the non-transitory machine-readable medium comprising:

- instructions to access print data of a virtual build volume including a 3D object to be generated by a 3D printer;
- instructions to determine a location for a 3D structure within the build volume to encapsulate a corresponding amount of build material therein;

instructions to determine an identifier for the 3D structure indicative of the determined location; and instructions to modify the print data to include the 3D structure with the determined identifier at the determined location What it is claimed is:

1. A computing system comprising:

a processor; and a non-transitory machine-readable medium storing instructions executable by the instructions to processor to perform processing comprising:

accessing print data of a virtual build volume including a 3D object to be generated by a 3D printer;

modifying the print data to include a 3D structure at a location within the virtual build volume to encapsulate an amount of build material, and to eject a thermal exposure indicator agent on at least part of an internal volume of the 3D structure;

receiving powder degradation data corresponding to powder degradation of the encapsulated amount of build material, including the amount on which the thermal exposure indicator agent has been ejected; and calibrating an additive manufacturing parameter of the 3D printer based on the powder degradation data.

2. The computing system of claim 1, wherein the powder degradation data includes a powder degradation metric.

3. The computing system of claim 1, wherein the print data is further modified to include a plurality of 3D structures at different locations within the virtual build volume to encapsulate a corresponding plurality of amounts of build material.

4. The computing system of claim 3, wherein the 3D structure comprises edges having thicknesses within a range of about 0.3 mm to about 1 mm.

5. The computing system of claim 3, wherein a polyhedron face comprises a hole.

6. The computing system of claim 3, wherein the 3D structure comprises internal structures defining a plurality of internal chambers within the internal volume of the 3D structure.

7. The computing system of claim 1, wherein the 3D structure is a polyhedron with more than 3 faces.

8. The computing system of claim 1, wherein the print data is further modified to embed the 3D structure inside the 3D object to be generated.

9. The computing system of claim 1, wherein the print data is further modified to include an identification element attached to the 3D structure indicative of the location of the 3D structure.

10. The computing system of claim 1, wherein the thermal exposure indicator agent is a thermochromic dye composition.

11. The computing system of claim 1, wherein the processing further comprises generating, using the 3D printer, the 3D object and the 3D structure based on the modified print data.

12. A method comprising:

modifying, by a processor, print data of a virtual build volume including a 3D object to be generated by a 3D printer to include a 3D structure at a location within the virtual build volume to encapsulate an amount of build material, and to eject a thermal exposure indicator agent on at least part of an internal volume of the 3D structure;

generating, by the processor, the 3D object and the 3D structure based on the modified print data;

determining, by the processor, a powder degradation metric of the encapsulated amount of build material, including the amount on which the thermal exposure indicator agent has been ejected; and calibrating an additive manufacturing parameter of the 3D printer based on the powder degradation metric.

13. The method of claim 12, further comprising modifying, by the processor, the print data to include a plurality of 3D structures at different locations within the virtual build volume to encapsulate a corresponding plurality of amounts of build material.

14. The method of claim 12, wherein the thermal exposure indicator agent is a thermochromic dye composition.

15. The method of claim 14, further comprising selecting either or both of a type and an amount of the thermochromic dye composition based on a type of build material to be used to generate the 3D object.

16. A non-transitory machine-readable medium storing instructions executable by a processor to perform processing comprising:

accessing print data of a virtual build volume including a 3D object to be generated by a 3D printer;

determining a location for a 3D structure within the virtual build volume to encapsulate an amount of build material therein;

determining an identifier for the 3D structure indicative of the determined location; and modifying the print data to include the 3D structure with the determined identifier at the determined location and to eject a thermal exposure indicator agent on at least part of an internal volume of the 3D structure.

17. The non-transitory machine-readable medium of claim 16, wherein the processing further comprises:

generating, using the 3D printer, the 3D object and the 3D structure based on the modified print data;

receiving powder degradation data corresponding to powder degradation of the encapsulated amount of build material, including the amount on which the thermal exposure indicator agent has been ejected; and calibrating an additive manufacturing parameter of the 3D printer based on the powder degradation data.

* * * * *